United States Patent
Kang et al.

(10) Patent No.: US 7,933,764 B2
(45) Date of Patent: Apr. 26, 2011

(54) SYSTEM AND METHOD FOR ADDING SEMANTIC SUPPORT TO EXISTING SYNTACTIC INFRASTRUCTURE

(75) Inventors: Myong Kang, Fairfax, VA (US); Bruce Montrose, Alexandria, VA (US); Jim Luo, Tulsa, OK (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 979 days.

(21) Appl. No.: 11/620,336

(22) Filed: Jan. 5, 2007

(65) Prior Publication Data

US 2007/0233457 A1    Oct. 4, 2007

(51) Int. Cl.
    *G06F 17/20*    (2006.01)
(52) U.S. Cl. .................. 704/8; 704/9; 704/1; 704/10
(58) Field of Classification Search .................. 704/8, 9, 704/10, 1
    See application file for complete search history.

(56) References Cited

U.S. PATENT DOCUMENTS

| | | | | |
|---|---|---|---|---|
| 5,418,717 A | * | 5/1995 | Su et al. | 704/9 |
| 6,243,670 B1 | * | 6/2001 | Bessho et al. | 704/9 |
| 6,480,843 B2 | * | 11/2002 | Li | 1/1 |
| 2002/0107840 A1 | * | 8/2002 | Rishe | 707/3 |

* cited by examiner

*Primary Examiner* — Qi Han
(74) *Attorney, Agent, or Firm* — Amy L. Ressing; Kerry L. Broome

(57) ABSTRACT

UDDI is not capable of handling semantic markups for Web services due to its flat data model and limited search capabilities. The present invention provides semantic service description and matchmaking with registries that conforms to UDDI specification. Specifically, the present invention stores complex semantic markups in UDDI data model and uses that information to perform semantic query processing. The present invention does not require any modification to the existing UDDI registries. The add-on modules reside only on clients who wish to take advantage of semantic capabilities. This approach is completely backward compatible and can integrate seamlessly into existing UDDI infrastructure.

1 Claim, 15 Drawing Sheets

FIG. 5

```
<tModel tModelKey = "uuid:AnonymousInstance2>
  <keyedReference tModelKey="uuid:BookSellerService"/>
  <keyedReferenceGroup>
    <keyedReference tModelKey="uuid:supportsEncryption"/>
    <keyedReference tModelKey="uuid:AnonymousInstance1"/>
  </keyedReferenceGroup>
  <keyedReferenceGroup>
    <keyedReference tModelKey="uuid:operatedBy">
    <keyedReference tModelKey="uuid:Myong">
  </keyedReferenceGroup>
</tModel>

<tModel tModelKey = "uuid:AnonymousInstance1>
  <keyedReference tModelKey="uuid:AES"/>
  <keyedReferenceGroup>
    <keyedReference tModelKey="keyGeneratedBy"/>
    <keyedReference tModelKey="uuid:Jim"/>
  </keyedReferenceGroup>
</tModel>
```

562

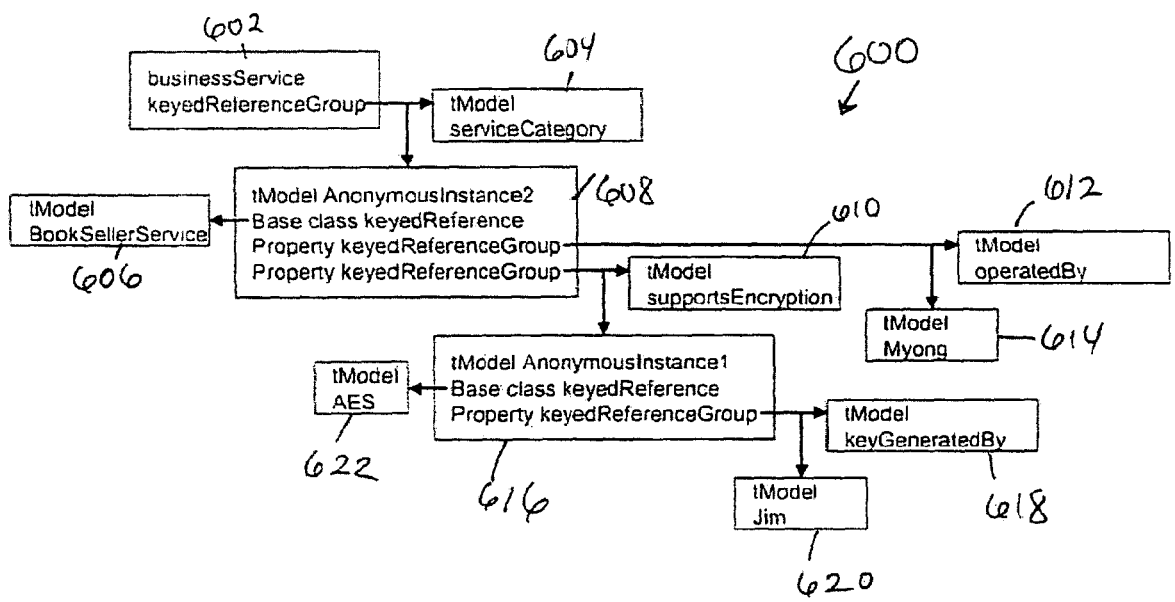

```
<BusinessService>
  <name>ServiceProfile1</name>
  <categoryBag>
    <KeyedReferenceGroup>
      <KeyedReference keyValue="exactProperty" tModelKey="uuid:profile:serviceCategory>    ⎤ property type
      <KeyedReference keyValue="exactRelationship" tModelKey="uuid:SellerService"/>         ⎤ property value concept
      <KeyedReference keyValue="specializationRelationship" tModelKey="uuid:BookSellerService"/>  ⎤ identity concepts
      <KeyedReference keyValue="generalizationRelationship" tModelKey="uuid:Service"/>      ⎦ of property value
    </KeyedReferenceGroup>
  </categoryBag>
</tModel>

<tModel tModelKey = "uuid:AnonymousInstance2>
  <categoryBag>
    <keyedReference keyValue="exactRelationship" tModelKey="uuid:AES"/>              ⎤ base class
    <keyedReference keyValue="generalizationRelationship" tModelKey="uuid:SymEnc"/>  ⎤ identity concepts of
    <keyedReference keyValue="generalizationRelationship" tModelKey="uuid:Encryption"/>  ⎦ base class
    <keyedReferenceGroup>
      <keyedReference keyValue="exactProperty" tModelKey="operatedBy"/>              ⎤ property type
      <keyedReference keyValue="generalizationProperty" tModelKey="contactPerson"/>  ⎦ Identity concept
                                                                                       of property type <keyedReference keyValue="exactRelationship" tModelKey="uuid:Myong"/>          ⎤ property value
      <keyedReference keyValue="generalizationRelationship" tModelKey="uuid:Individual"/>  ⎤ identity concepts
      <keyedReference keyValue="generalizationRelationship" tModelKey="uuid:Identity"/>    ⎦ of property value
    </keyedReferenceGroup>
  <categoryBag>
</tModel>
```

FIG. 12

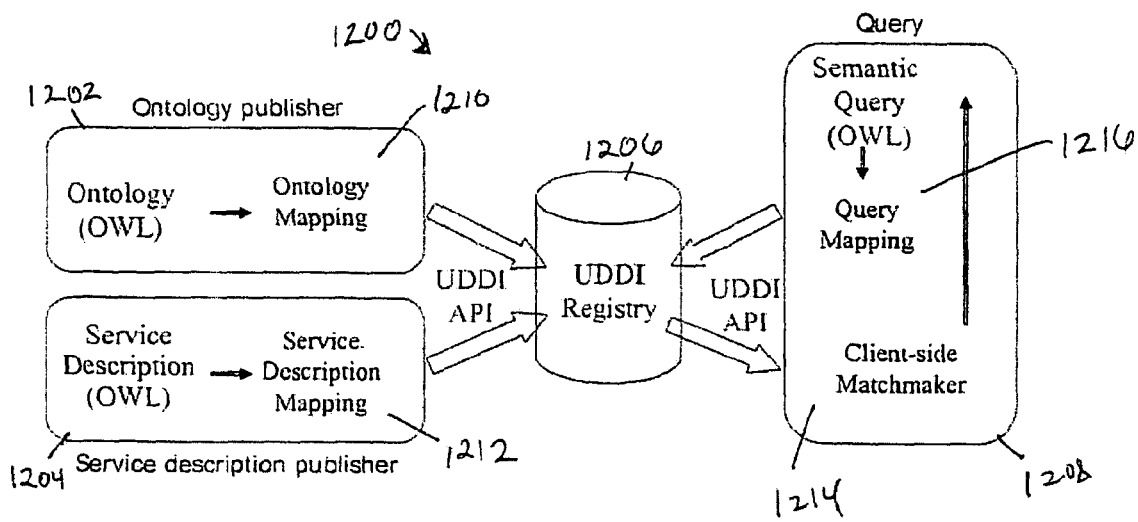

FIG. 13
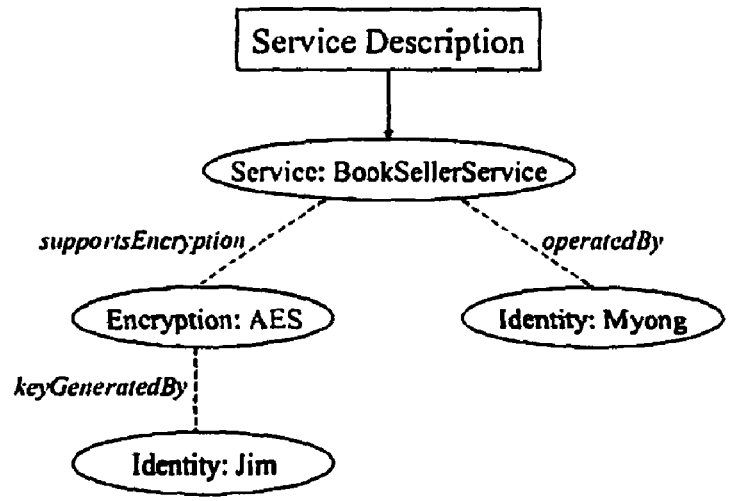
FIG. 14
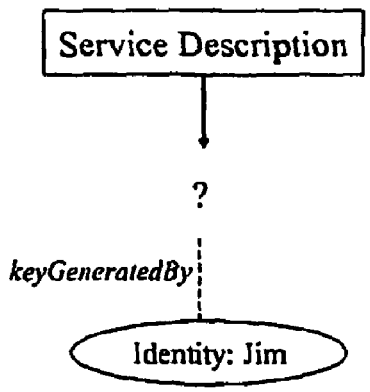
FIG. 15
```
<tModel tModelKey="uuid:isOntologyBase">
  <name>isOntologyBase</name>
  <categoryBag>
    <keyedReference keyValue="categorization" tModelKey="uddi:uddi.org:categorization:types"/>
    <keyedReference keyValue="valueSet" tModelKey="uddi:uddi.org:categorization:types"/>
  </categoryBag>
</tModel>
```

FIG. 16

```xml
<tModel tModelKey="uuid:isAnonymousInstance">
  <name>isAnonymousInstance</name>
  <categoryBag>
    <keyedReference keyValue="categorization" tModelKey="uddi:uddi.org:categorization:types"/>
    <keyedReference keyValue="valueSet" tModelKey="uddi:uddi.org:categorization:types"/>
  </categoryBag>
</tModel>
```

FIG. 17

```xml
<tModel tModelKey="uuid:propertyDefinition">
  <name>propertyDefinition</name>
  <categoryBag>
    <keyedReference keyValue="categorization" tModelKey="uddi:uddi.org:categorization:types"/>
    <keyedReference keyValue="valueSet" tModelKey="uddi:uddi.org:categorization:types"/>
    <keyedReference keyValue="categorizationGroup" tModelKey="uddi:uddi.org:categorization:types"/>
  </categoryBag>
</tModel>
```

FIG. 18

```xml
<tModel tModelKey="uuid:tModelsUsed">
  <name>tModelsUsed</name>
  <categoryBag>
    <keyedReference keyValue="categorization" tModelKey="uddi:uddi.org:categorization:types"/>
    <keyedReference keyValue="valueSet" tModelKey="uddi:uddi.org:categorization:types"/>
    <keyedReference keyValue="categorizationGroup" tModelKey="uddi:uddi.org:categorization:types"/>
  </categoryBag>
</tModel>
```

FIG. 19

```xml
<tModel tModelKey="uuid:propertyRestriction">
  <name>propertyRestriction</name>
  <categoryBag>
    <keyedReference keyValue="categorization" tModelKey="uddi:uddi.org:categorization:types"/>
    <keyedReference keyValue="valueSet" tModelKey="uddi:uddi.org:categorization:types"/>
    <keyedReference keyValue="categorizationGroup" tModelKey="uddi:uddi.org:categorization:types"/>
  </categoryBag>
</tModel>
```

FIG. 20

2002:
```
<!ENTITY service "http://ontology.com/service.owl">
<owl:Ontology>
  <rdfs:comment>A Service Ontology</rdfs:comment>
</owl:Ontology>
```

2004:
```
<tModel tModelKey="uuid:service">
  <name>service</name>
  <description>A Service Ontology</description>
  <overviewURL>http://ontology.com/service.owl</overviewURL>
  <keyedReference keyValue="categorization" tModelKey="uddi:uddi.org:categorization:types"/>
  <keyedReference keyValue="valueSet" tModelKey="uddi:uddi.org:categorization:types"/>
</tModel>
```

FIG. 21

2102:
```
<owl:ObjectProperty rdf:ID="operatedBy">
  <rdfs:domain rdf:resource="#Service"/>
  <rdfs:range rdf:resource="&identity;Identity"/>
</owl:ObjectProperty>
```

2104:
```
<tModel tModelKey="uuid:operatedBy">
  <name>operatedBy</name>
  <categoryBag>
    <keyedReference keyValue="categorization" tModelKey="uddi:uddi.org:categorization:types"/>
    <keyedReference keyValue="valueSet" tModelKey="uddi:uddi.org:categorization:types"/>
    <KeyedReference keyValue="ontologyReference" tModelKey="uuid:service"/>
    <KeyedReference keyValue="exactProperty" tModelKey=" uuid:operatedBy"/>
    <KeyedReference keyValue="generalizationProperty" tModelKey=" uuid:contactPerson"/>   } identity concepts
    <KeyedReferenceGroup tModelKey="uuid:propertyRestriction">
      <KeyedReference keyValue="domain" tModelKey="uuid:Service"/>
      <KeyedReference keyValue="range" tModelKey="uuid:Identity"/>
    </KeyedReferenceGroup>
  </categoryBag>
</tModel>
```

FIG. 22

2202:
```
<owl:Class rdf:ID="SellerService">
  <rdfs:subClassOf rdf:resource="#Service"/>
</owl:Class>
```

2204:
```
<tModel tModelKey="uuid:SellerService ">
  <name>SellerService</name>
  <categoryBag>
    <keyedReference keyValue="categorization" tModelKey="uddi:uddi.org:categorization:types"/>
    <keyedReference keyValue="valueSet" tModelKey="uddi:uddi.org:categorization:types"/>
    <KeyedReference keyValue="ontologyReference" tModelKey="uuid:Service"/>
    <KeyedReference keyValue="exactRelationship" tModelKey="uuid:SellerService"/>
    <KeyedReference keyValue="generalizationRelationship" tModelKey="uuid:Service"/>   } identity concepts
    <KeyedReference keyValue="specializationRelationship" tModelKey="uuid:BookSeller"/>
  </categoryBag>
</tModel>
```

FIG. 24

```
2402 {
  <profile:Profile rdf:ID="ServiceProfile1">
    <profile:serviceCategory rdf:resource="&service:BookSeller">
      <service:supportsEncryption rdf:resource="&encryption:AES">     } Anonymous   } Anonymous
        <encryption:KeyGeneratedBy rdf:resource="&identity;Jim"/>       Instance 1     Instance 2
      </service:supportsEncryption>
    <service:operatedBy rdf:resource="&identity;Myong"/>
  </profile:Profile>
```

```
2404 {
  <tModel tModelKey="uuid:AnonInst2">
    <name></name>
    <categoryBag>
      <keyedReference keyValue="categorization" tModelKey="uddi:uddi.org:categorization:types"/>
      <keyedReference keyValue="valueSet" tModelKey="uddi:uddi.org:categorization:types"/>
      <KeyedReference keyValue="ontologyReference" tModelKey="uuid:service"/>
      <KeyedReference keyValue="exactRelationship" tModelKey="uuid:BookSeller"/>           ─ base class
      <KeyedReference keyValue="generalizationRelationship" tModelKey="uuid:SellerService"/>  ─ identity concepts of
      <KeyedReference keyValue="generalizationRelationship" tModelKey="uuid:Service"/>        ─ base class
      <KeyedReferenceGroup tModelKey="uuid:propertyDefinition">
        <KeyedReference keyValue="exactProperty" tModelKey="uuid:Service:supportsEncryption"/>  ─ property type
        <KeyedReference keyValue="specificRelationship" tModelKey="uuid:AnonInst1"/>            ─ property value concept
        <KeyedReference keyValue="exactRelationship" tModelKey="uuid:AES"/>                     ─ property value base class
        <KeyedReference keyValue="generalizationRelationship" tModelKey="uuid:SymEnc"/>         ─ property value base class
        <KeyedReference keyValue="generalizationRelationship" tModelKey="uuid:Encryption"/>     ─ identity concept
      </KeyedReferenceGroup>
      <KeyedReferenceGroup tModelKey="uuid:propertyDefinition">
        <KeyedReference keyValue="exactProperty" tModelKey="uuid:Service:operatedBy"/>          ─ property type
        <KeyedReference keyValue="generalizationProperty" tModelKey="uuid:Service:contactPerson"/> ─ property type identity concept
        <KeyedReference keyValue="exactRelationship" tModelKey="uuid:Myong"/>                   ─ property value concept
        <KeyedReference keyValue="exactRelationship" tModelKey="uuid:Individual"/>
        <KeyedReference keyValue="exactRelationship" tModelKey="uuid:Identity"/>                ─ property value identity concept
      </KeyedReferenceGroup>
    </categoryBag>
  </tModel>

<tModel tModelKey="uuid:AnonInst1">
    ...
  </tModel>
```

FIG. 29

```
<find_service xmlns="urn:uddi-org:api_v3" >
 <categoryBag>
  <keyedReferenceGroup tModelKey="uuid:propertyDefinition">
   <keyedReference tModeKey="uddi:BookBuyerService" keyValue="exactRelationship"/>
   <keyedReference tModeKey="uddi:serviceCategory" keyValue="exactCategory"/>
  </keyedReferenceGroup>
 </categoryBag>
</find_service>
```

FIG. 30

```
<find_service xmlns="urn:uddi-org:api_v3" >
 <findQualifier>uddi-org:approximateMatch:SQL99</findQualifier>
 <categoryBag>
  <keyedReferenceGroup tModelKey="uuid:propertyDefinition">
   <keyedReference tModelKey="uddi:BookBuyerService" keyValue="%"/>
   <keyedReference tModelKey="uddi:serviceCategory" keyValue="%"/>
  </keyedReferenceGroup>
 </categoryBag>
</find_service>
```

FIG. 31

```
<find_service xmlns="urn:uddi-org:api_v3" >
 <findQualifier>uddi-org:approximateMatch:SQL99</findQualifier>
 <categoryBag>
  <keyedReferenceGroup tModelKey = "tModelsUsed">
   <keyedReference keyValue="uuid:keyGeneratedBy" tModelKey="uuid:Jim"/>
  </keyedReferenceGroup>
 </categoryBag>
</find_Service>
```

SYSTEM AND METHOD FOR ADDING SEMANTIC SUPPORT TO EXISTING SYNTACTIC INFRASTRUCTURE

BACKGROUND

Service Oriented Architecture (SOA) is a design for linking computational resources (principally, applications and data) on demand to achieve the desired results for service consumers (which can be end users or other services). OASIS (the Organization for the Advancement of Structured Information Standards) defines SOA as the following: a paradigm for organizing and utilizing distributed capabilities that may be under the control of different ownership domains. It provides a uniform means to offer, discover, interact with and use capabilities to produce desired effects consistent with measurable preconditions and expectations.

Automatic discovery of Web services is an important capability for the SOA. The first step in providing this capability is to markup Web services with metadata in a well-understood and consistent manner. The next step in providing automatic discovery is to advertise those service descriptions in a registry capable of fine-grained semantic matchmaking. Universal Description, Discovery and Integration (UDDI) is a Web-based distributed registry standard for the SOA. UDDI allows providers to publish descriptions of Web services they are offering and potential clients to query for Web services they require. It is one of the central elements of the interoperable framework and an OASIS standard with major backers including IBM and Microsoft. The specification is becoming widely accepted as a Web infrastructure standard and is already seeing widespread use in companies, government agencies, and the military.

Currently, the SOA relies on syntax based standards such as UDDI, which is an acronym for Universal Description, Discover, and Integration, a platform-independent, XML-based registry for businesses worldwide to list themselves on the Internet. UDDI is an open industry initiative, sponsored by OASIS, enabling businesses to publish service listings and discover each other and define how the services or software applications interact over the Internet.

In both computer science and information science, an ontology is a data model that represents a domain and is used to reason about the objects in that domain and the relations between them. Ontologies generally describe: 1) individuals—the basic or "ground level" objects; 2) classes—sets, collections, or types of objects; 3) attributes—properties, features, characteristics, or parameters that objects can have and share; and 4) relations—ways that objects can be related to one another. Conventional web-based ontologies are capable of storing and processing semantic service descriptions, i.e., service descriptions that include relations between data structures. However, UDDI is not capable of storing and processing semantic service descriptions.

The UDDI registry uses a system of categorization and identification restricted to predefined categorization information comprising syntactic concept data structures. For example, a vender may register its Web services in UDDI as a first group titled "reading materials" and a second group titled "writing materials." Further, the system of categorization and identification of the UDDI registry permits further classification, wherein the group "reading materials" may be broken down into further sub-groups of syntactic concept data structures, e.g., a first sub-group titled "comic books" and a second sub-group titled "novels."

Accordingly, an external client may query the UDDI registry for not only venders dealing with reading materials, but further for venders dealing specifically with comic books.

Although UDDI is widely used by various industry, government and university entities, its basic system of categorization and identification severely limits is usefulness. Specifically, the system of categorization and identification of the UDDI registry fails to permit relationship searches. Non-limiting examples of relationship searches include searching for verbals relating data structures or Boolean relations of data structures. As an example, the UDDI registry may have a data structure of "Jim" under the larger data structure "novels". However, an external client searching the UDDI registry would not be able to determine if Jim is a "seller of" novels or a "buyer of" novels. Further, an external client searching the UDDI registry would not be able to search for Jim and "NOT" novels.

As service descriptions and requests become more complicated, automatic and effective matchmaking will require semantic metadata—data that is more rich than syntactic data in the sense that semantic metadata includes relationships between data structures. Ontologies are used in the semantic web as a form of knowledge representation about the world or some part of it.

The Web ontology language (OWL) was developed to specifically to address this problem. OWL is a machine understandable description language that is capable of describing resources in a manner much richer than traditional flat taxonomies and classification systems used by UDDI. OWL-S, or OWL for services, uses an ontology that provides a core set of constructs specifically for describing Web services. OWL-S allows for descriptions of Web service inputs, outputs, operations, and categorization using ontology concepts. OWL-S is designed for use by applications that need to process the content of information instead of just presenting information to humans. It facilitates greater machine interpretability of Web content than that supported by XML, RDF, and RDF Schema (RDF-S) by providing additional vocabulary along with a formal semantics. OWL allows for creation of ontologies that can be used to add semantic meaning to concepts in a particular domain of interest.

In contrast to the UDDI registry, described above, OWL uses a much more complex ontology that is not restricted to predefined categorization information. Specifically, the ontology of an OWL registry permits relationship searches. As an example, an OWL registry may define a property "sold by" and attach it from the concept "novels" to the concept "Jim." As such, an external client searching such an OWL registry would be able to search for novels sold by Jim.

OWL-S adds the following capabilities in terms of service description markup and query.

OWL ontologies organize concepts into a class hierarchy. This allows for specification of service descriptions and requests in various levels of detail. Matchmakers that understand the class hierarchy will be able to match related concepts even if they are syntactically distinct.

OWL ontologies allow for refinement of concepts by attachment of properties. Using properties, composite concepts can be defined that do not exist in the original ontology. This allows for fine-grained definition of concepts in various levels of detail that can be used in service descriptions.

OWL ontologies allow for inference, which is the deduction process based on the relationships specified in the ontology. For example, a matchmaker can infer that a Service operated by Jim should match the query for a SellerService (which is a subclass of Service) operated by an Individual (which is a class that instance Jim belongs) even though this is not explicitly stated anywhere in the ontology.

OWL ontologies allow for dynamic discovery. Conventional syntax based SOA standards will allow for dynamic invocation of Web services. However, it can only take place for Web services that have already been discovered. Dynamic discovery, on the other hand, needs to deal with unknown services. It will require the use of semantic metadata that software agents can understand. WSDL cannot attach meaning to data. Thus, identical syntactic data can have entirely different semantic meanings. For example, the WSDL parameters specifications for a BookBuyer service and a BookSeller service can be identical. They can both have book name as input and price as output. However, the same price output refers to the buying price for BookBuyer and the selling price for the BookSeller. However, this information can be captured using semantic metadata that reference ontology concepts. Agents can then understand service descriptions without intervention from the human user thus enabling dynamic discovery as well as dynamic invocation of Web services.

It is clear that a registry that supports semantic annotation and matchmaking for Web services will produce much more refined search results. There are several possible approaches in developing such a semantic registry. The first approach is to completely abandon the UDDI specification and create a new registry standard specifically designed for OWL with new data model, API, and implementations. The second approach is to incorporate OWL into existing UDDI registry implementations without modification. This could involve not supporting certain aspects of OWL functionality, but it would seamlessly integrate into the existing services infrastructure. A third, hybrid approach, is to introduce small modifications to the UDDI specification for semantic support. The authors of the UDDI specification made a concerted effort not to limit the potential capability of the registry. They provide a framework for extensions so that registry implementations can provide capabilities not included in the original UDDI specification. While the UDDI specification supports extensions, this approach requires significant modification to the registry implementations and infrastructure. This would not be a simple matter.

OWL allows for semantic description of Web services based on shared ontologies. The ontologies are developed by industry in a particular domain or by standards bodies. Individual organizations then publish service descriptions based on classes established in the ontologies. This is analogous to the systems of categorization and identification envisioned by the current UDDI specification. However, the information contained in ontologies is much richer and their use is much more complex.

There are two major differences that make OWL incompatible with UDDI in its current state. First, ontologies are much richer than the flat categorization and identification systems used by UDDI. OWL supports properties that allow service descriptions to assert more specific facts about the members of classes or individuals. OWL-S service descriptions use properties to create composite concepts that contain multiple layers of annotations. For example, a service can publish itself as a BookSeller service that supports AES encryption and is operated by Jim. The UDDI data model is not capable of storing such descriptions involving composite concepts with multiple layers of annotations (see FIG. 2). Second, ontologies establish relationships among classes. Thus, matching should be done semantically. The class hierarchies involving subclass and equivalence class relationships should be taken into account by the query engine. For example, if a service publishes itself as a BookSellerService, it should be found by queries for SellerService because it is the parent class. UDDI, however, only supports syntax-based match that will not take into account the class hierarchy of the ontology.

Hence there are two main challenges in providing OWL support using UDDI registries. First, OWL descriptions should be correctly expressed in the UDDI data model without losing any details. Second, ontology awareness and semantic matching should be incorporated into the querying process. Facilitation of this will govern mapping.

What is needed is a system and method to enable the complex querying capabilities of an OWL registry in the restricted UDDI registry. More generally, what is needed is a system and method to enable the complex querying capabilities of a semantic data structure registry in a syntactic data structure registry.

BRIEF SUMMARY

It is another object of the present invention to provide a system and method that fulfills the needs discussed above.

The present invention provides a method and system that creates semantic data and syntactic data. In an exemplary embodiment, the semantic data is created as a plurality of groups of semantic concept data structures and at least one semantic relationship data structure relating at least one of the semantic concept data structures to another of the semantic concept data structures. Further, the syntactic data is created as a plurality of groups of syntactic concept data structures corresponding to the plurality of groups of semantic concept data structures respectively, and at least one syntactic relationship data structure relating at least one of the syntactic concept data structures to another of the syntactic concept data structures, the at least one syntactic relationship data structure corresponding to the at least one semantic relationship data structure, respectively. Still further, there semantic query processing performed against the created syntactic data.

Semantic markups and Web services match capabilities are added to existing registry implementations that conform to UDDI specification without extension or modification. An exemplary embodiment of the present invention may be deployed seamlessly into an existing SOA infrastructure.

In accordance with the present invention each individual semantic concept data structure within an ontology including classes, object properties and relationships to other semantic concept data structures within the ontology may be incorporated into a syntactic registry, e.g., the UDDI registry, as an object referred to as a tModel (or tModel Object) that can be referenced individually. The tModel serves as a placeholder for an external resource, wherein the actual structure and organization of the external resource is not imported into the registry. Specific concepts inside the external resource are referenced using objects called keywords.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings:

FIG. 5 illustrates an example of anonymous instance tModels, wherein chaining captures multiple layers of annotation;
FIG. 6 shows the overall structure of UDDI data model objects representing the service description presented in FIG. 2;
FIG. 11 illustrates how identity concepts are copied whenever ontology concepts are referenced in accordance with an exemplary embodiment of the present invention;
FIG. 12 illustrates a system architecture in accordance with an exemplary embodiment of the present invention;
FIG. 13 illustrates the structure of complete service description queries in accordance with an exemplary embodiment of the present invention;
FIG. 14 illustrates the structure of partial service description queries in accordance with an exemplary embodiment of the present invention;
FIG. 15 illustrates an "isOntologyBase" tModel in accordance with an exemplary embodiment of the present invention;
FIG. 16 illustrates an "isAnonymousInstance" tModel in accordance with an exemplary embodiment of the present invention;
FIG. 17 illustrates a "propertyDefinition" tModel in accordance with an exemplary embodiment of the present invention;
FIG. 18 illustrates a "tModelIsUsed" tModel in accordance with an exemplary embodiment of the present invention;
FIG. 19 illustrates a "propertyRestiction" tModel in accordance with an exemplary embodiment of the present invention;
FIG. 20 illustrates a translation of ontology tModels in accordance with an exemplary embodiment of the present invention;
FIG. 21 illustrates a translation of property type tModels in accordance with an exemplary embodiment of the present invention;
FIG. 22 illustrates a translation of class and instance tModels in accordance with an exemplary embodiment of the present invention;
FIG. 24 illustrates a translation of anonymous instance tModels in accordance with an exemplary embodiment of the present invention;

FIG. 29 illustrates an UDDI query for specific types of matches in accordance with an exemplary embodiment of the present invention;
FIG. 30 illustrates an UDDI query for all types of matches in accordance with an exemplary embodiment of the present invention;
FIG. 31 illustrates an UDDI query for partial service description queries in accordance with an exemplary embodiment of the present invention.

DETAILED DESCRIPTION

UDDI Overview

UDDI is intended to serve as a repository for Web service descriptions. To facilitate description and discovery of Web services, the UDDI specification defines a set of data models for storing Web service descriptions and an application program interface (API) for interacting with the registry. The core data model consists of objects describing the Web service (businessService), the service provider (businessEntity), and the service binding (bindingTemplate). In addition to the static text-based data fields, these data objects can incorporate metadata into the description by making references to tModels. TModels, or technical models, provide extensibility to the overall UDDI framework because they can be used to represent any concept or construct. Examples include standards, protocols, identification systems, categorization systems, and namespaces. The versatility of the tModel comes from the fact that it only needs to serve as a placeholder. Information is not actually imported into the registry. The tModel simply holds a pointer to external resources providing that information. The UDDI standard envisions two primary functions for tModel references in the context of service description. The first primary function is to represent standard interfaces, specifications, or protocols such as HTTP, SSH, and WSDL documents. References to these tModels indicate conformance to the standard. The second primary function is to represent identification or categorization systems such as NAICS, UNSPSC and U.S. Tax ID. References to these tModels indicate adherence to the systems along with specification of a specific value within the system.

In the UDDI framework, core data model objects reference tModels with keyedReference and keyedReferenceGroup objects stored under a categoryBag object or an identifierBag object. The KeyedReference object has three data fields—tModelKey, keyValue and KeyName. Tile tModelKey is the unique identifier of the tModel being referenced. The keyValue is the keyword within the categorization or identification system and is only necessary when referencing tModels for identification or categorization systems. The keyName is the descriptive name intended for human understanding, is optional and is not used by the registry for matching in most instances.

The keyedReferenceGroup object can be used to group logically related concepts. It has a tModelKey field and one or more instances of keyedReferences. For example, when specifying a longitude and latitude pair, the tModelKey of the keyedReferenceGroup would point to the tModel for a mapping system and there would be two keyedReferences holding values for longitude and latitude respectively.

The tModel framework is very powerful and provides the UDDI system with a great deal of extensibility and flexibility. tModels can be used for a variety of different purposes including storage of ontology information and OWL descriptions.

Semantic Annotation and Matchmaking

Figure 1A:
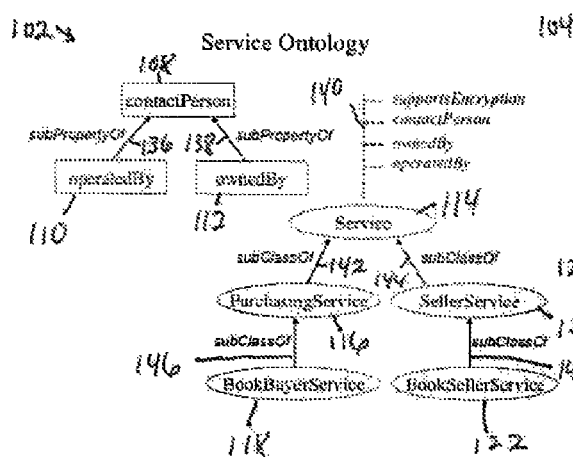
FIG. 1A illustrates an exemplary service ontology.
Figure 1B:
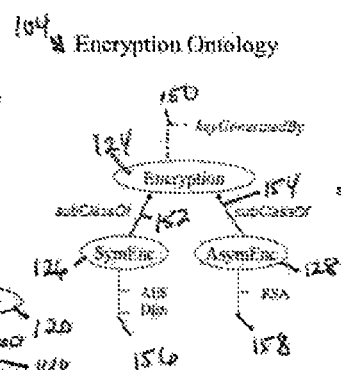
FIG. 1B illustrates an exemplary encryption ontology.
Figure 1C:
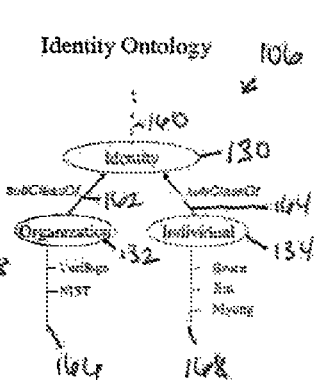
FIG. 1C illustrates an exemplary identity ontology.
Figure 2:
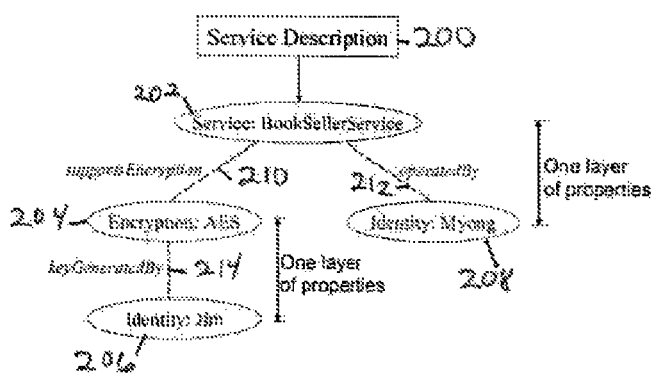
FIG. 2 illustrates a service description.

This section describes exemplary semantic annotations and matchmaking supported by an exemplary embodiment of the present invention. For purposes of illustration, the following three example ontologies in FIGS. 1A-C and the service description in FIG. 2 will be referenced. FIG. 1A illustrates an exemplary service ontology 102. FIG. 1B illustrates an exemplary encryption ontology 104. FIG. 1C illustrates an exemplary identity ontology 106. FIG. 2 illustrates a service description 200. Each of the ontologies in FIGS. 1A-C includes information of a single domain. On the contrary, the service description in FIG. 2 includes information of many domains.

In FIGS. 1A-1C, ovals 114, 116, 120, 122, 124, 126, 128, 130, 132 and 134 represent classes and rectangles 108, 110 and 112 represent property types. Solid lines extending downwards represent instances of classes and dotted lines extending upwards represent properties that can be attached to the class. The arrows between classes and between property types represent hierarchical relationships. As illustrated in FIG. 1A, contactPerson property 108 is defined as a transitive property.

In FIG. 2, oval 202 corresponds to service ontology 102, oval 204 corresponds to encryption ontology 104, and ovals 206 and 208 correspond to identity ontology 106. In service description diagram 200, the property annotations that further refine the class are represented by dotted lines 210, 212 and 214, respectively. It is clear from FIG. 2 that oval 204 and oval 208 are one layer of properties of oval 202. Similarly, oval 206 is one layer of properties of oval 204.

Semantic annotations of Web services use the concepts from ontologies. For example, a Web service may advertise itself as a BookSellerService from the Service Ontology. The service description can further annotate the ontology concept by defining properties such as in illustrated in FIG. 2. Semantic annotations can have multiple layers of annotations. However, the UDDI data model is only capable of storing one layer of annotations because it was designed to deal with flat identification and categorization systems that do not support properties. Thus the first challenge is to correctly express complex semantic service descriptions in the UDDI data model without losing any details.

The second challenge is to provide support for semantic query. Two types of queries are supported by system in accordance with the present invention—exact match queries and semantic match queries.

Exact Match Queries

The first type of queries uses the same concepts as those specified in the service description. Query processing does not require ontology awareness. Non-limiting examples of exact match Queries include: Find a BookSeller service; Find a BookSeller service operated by Myong; Find a BookSeller service that supports AES encryption; and Find a BookSeller service that supports AES encryption with key generated by Jim.

Semantic Match Queries

The second type of queries uses semantically related concepts as those specified in the service description. Query processing requires ontology awareness. Non-limiting examples of semantic match queries include: Find a BookSeller service that supports SymEnc; Find a BookSeller service that supports Encryption; and Find a BookSeller that supports SymEnc with the key generated by Jim.

The classes and instances specified by semantic match queries are not the same as those in the service description. However, they should all match to the service description in FIG. 2 because they are related due to the class hierarchy established by the ontologies. This class hierarchy between concepts should be captured and taken into account by the UDDI registry in order to support semantic queries. A detailed description of query support will be described below.

Mapping Strategy from Service Description in OWL to UDDI

This subsection provides a broad overview and reasoning behind the mapping strategy from OWL to the UDDI data model in accordance with an exemplary embodiment of the present invention.

Each individual concept within the ontology including classes and object properties may be incorporated into the UDDI registry as a tModel object that can be referenced individually. This use of tModels is more complex than what is envisioned by the UDDI specification. The tModel serves as a placeholder for an external resource, wherein the actual structure and organization of the external resource is not imported into the registry. Specific concepts inside the external resource are referenced using keywords stored in the keyValue field of KeyedReferences.

In other words, in accordance with the present invention, an original semantic ontology is transformed to a corresponding syntactic ontology. For example, as discussed in more detail below, the service description of FIG. 2 is illustrated as UDDI data model objects in FIG. 6. Specifically, the original semantic ontology includes semantic data comprising a plurality of groups of semantic concept data structures and semantic relationship data structures. The semantic relationship data structures relate the semantic concept data structures to one another, such as for example by verbals relating data structures or Boolean relations. Syntactic data is created as a plurality of groups of syntactic concept data structures that correspond to the plurality of groups of semantic concept data structures of the original semantic ontology, respectively. Further, the syntactic data includes syntactic relationship data structures corresponding to the semantic relationship data structures, respectively.

Figure 3:
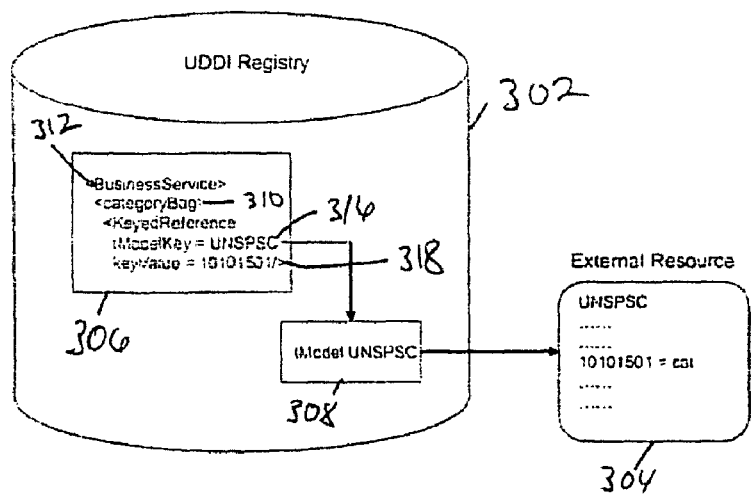
FIG. 3 illustrates tModel references using categorization systems.

FIG. 3 illustrates tModel references using categorization systems, wherein item 302 is the UDDI registry, item 304 is an external resource, item 306 is a service description in UDDI registry 302, and item 308 is a tModel pointer. For example, to make a reference to "cat" in external resource 304, the categoryBag object 310 of the BusinessService object 312 in service description 306 may hold a KeyedReference object 314 to the UNSPSC tModel object 316 with keyValue object 318 of 10101501. The meaning of 10101501 is not imported into UDDI registry 302 and has to be looked up at external resource 304. An UDDI search engine performs syntax matching and the meaning of the keywords is not important.

Under this traditional UDDI scheme, the "cat" concept cannot be refined with another layer of annotation. There is no way to specify a more specific cat, such as by stating that its age is three months or its origin is Persia. This is because the cat concept exists as an external resource. Service descriptions are limited to the level of specificity included in the categorization or identification system.

OWL concepts, on the other hand, can be annotated with additional property values as long as the specific ontology allows for it. Since the property values can be ontology classes and instances themselves, these composite concepts can have multiple layers of annotations like the example in FIG. 2. This is the reason that each individual concept in the ontology needs to be incorporated into the UDDI registry as a tModel object that can be referenced individually.

Figure 4:
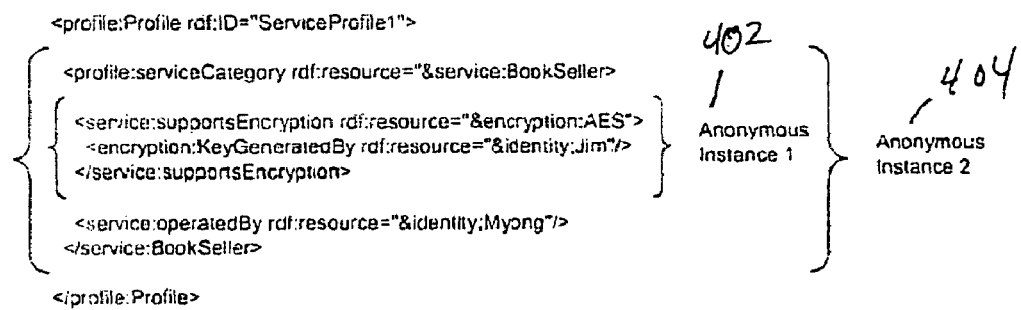
FIG. 4 is an OWL-S representation of the concept in FIG. 2 defined as part of a service description.
Figure 7A:
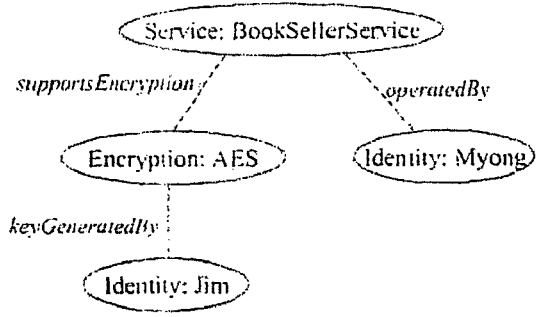
FIGS. 7A-D illustrate identity concepts of the concept described in FIG. 2.
Figure 7B:
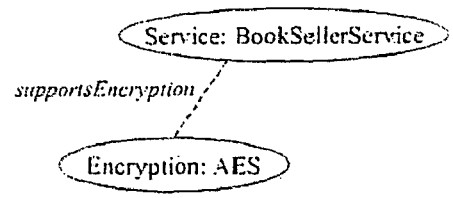
Figure 7C:
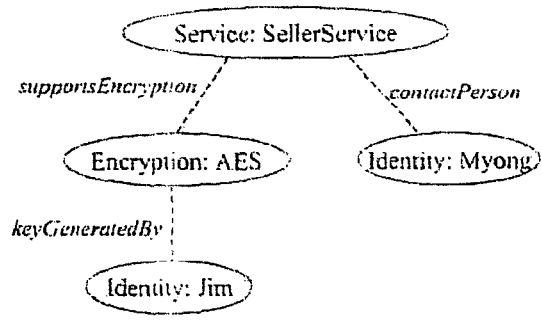
Figure 7D:
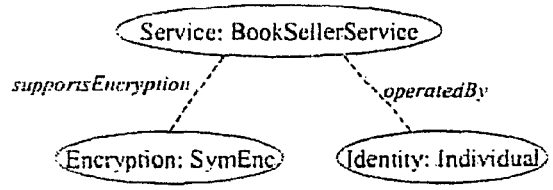

Anonymous instances are objects and are composite concepts defined as part of a service description. They are unnamed and do not exist in the original ontology. FIG. 4 is an OWL representation of the concept in FIG. 2 defined as part of a service description. The composite concepts are anonymous instances. Anonymous instance 1 designated as item 402 corresponds to items 204, 214 and 206 of FIG. 2. Anonymous instance 2 designated as item 404 corresponds to the entire service description 200 of FIG. 2.

Anonymous instances cannot be referenced using keywords in the same way as concepts in categorization or identification systems. Since they do not exist in the original ontology, they may not have agreed upon names that can be used as keywords. However, anonymous instances are distinct and need to be referenced individually. The present invention solves this problem by importing the ontology into the registry and representing each class or instance with its own tModel. The base ontology concept tModels may be named and can be queried for by name. Anonymous instances defined by service descriptions may be represented by a new unnamed tModel created as extensions to the ontology. The tModel may have to capture the base class of the anonymous instance in a KeyedReference. The annotations are captured as KeyedReferenceGroups. They may hold references to the property type and property value concepts tModels as child KeyedReference elements. They may be queried for using the base class and the property definitions. Each tModel can hold one layer of annotations, and chaining multiple tModels together may allow for representation of composite classes with multiple layers of annotation.

FIG. 5 illustrates an example of anonymous instance tModels and is an UDDI representation in accordance with the present invention, wherein chaining captures multiple layers of annotation. The objects designated by item 502 correspond to items 204, 214 and 206 of FIG. 2.

An entire anonymous instance can be referred to by referencing the top layer concept tModel. FIG. 6 shows the overall structure of UDDI data model objects 600 representing the service description 200 presented in FIG. 2. UDDI data model objects 600 include objects 602, 604, 606, 608, 610, 612, 616, 614, 618, 620 and 622. New tModels, AnonymousInstance1 616 and AnonymousInstance2 608, are created to represent the composite anonymous instances. BusinessService object 602 references the overall concept by simply referencing the top level concept tModel.

Strategy for Performing Semantic Query

The UDDI search engine is only capable of performing syntax matching or matching of syntactic concept data structures. It will not take into account the subclass, superclass and equivalent class relationships established in the ontology class hierarchy. For example, as illustrated in FIG. 1B, AES is a sub-class of Encryption. However, there is no way to tell the UDDI search engine to treat AES and Encryption as related classes so that queries for one will return the other. This information can be captured easily in the tModels for the ontology concepts. For example, the tModel for AES can simply hold a remark with the information stating that it should be returned by queries for Encryption. However, there is no standard way of making the UDDI search engine understand such a remark. The approach in accordance with an exemplary embodiment of the present invention is to fully capture the class and object property hierarchy information inside the UDDI registry in a way that special queries can be formed to take that semantic information into account. This way, the syntactic UDDI search engine can be made to return semantic results.

One possible approach is to resolve all the ontology relationships for concepts and properties at publishing time so that whenever a service description refers to a concept, it will make additional references to all its identity concepts. Identity concept may be considered as a related concept that queries should also return when they return the original concept. If a query for class A should return class B, then class A would be an identity class of class B. All service description references to class B would also have to include a reference to class A. This applies to classes and instances as well as object property types. The list of identity concepts depends on the concept hierarchy established in the ontology using the constructs subClassOf, equivalenceClass, for classes and instances, and subPropertyOf, and equivalenceProperty for property types. In addition, classes can be defined using complex class expressions with Boolean combinations involving the constructs of unionOf, intersectionOf, and complementOf. For anonymous instances, identity concepts can also be derived by varying the concepts and removing property definitions. For example, the concepts illustrated in FIGS. 7A-7D are all identity concepts of the concept described in FIG. 2. That is, queries for these concepts should return the concepts described in FIG. 2.

The problem with this approach is that the list of identity concepts for anonymous instances will grow exponentially with the complexity of the concept. The list of identity concepts for anonymous instances should include not only the classes and instances already in the ontology, but also any other anonymous instances that could potentially be created by service descriptions in the future. Otherwise whenever a new anonymous instance tModel is created, all previously created concept tModels will have to be checked to see if they need to reference the new tModel as an identity concept. The complexity of doing so will make it impossible. Also, it will be impossible to enumerate them all for complex anonymous instance with multiple layers of description since the number of possible identity concepts grows exponentially.

Another approach is to create the query with the list of identity concepts that already exist in the registry. This approach will be scalable because instead of having to deal with all possible identity concepts, it will only have to include ones that have already been created. The problem is that this approach requires the UDDI registry to provide support for Boolean queries. Suppose the query is for services that support AES and are operated by Jim, if the identity classes of AES include SymEnc and Encryption, and the identity classes of Jim include Individual and Identity, then query for the BusinessServices is represented by the following Boolean expression.

(supportsEncryption AND (AES OR SymEnc OR Encryption)) AND (operatedBy AND (Jim OR Individual OR Identity))

The above Boolean expression cannot be expressed as a single query in the current version of UDDI, which only allows for Boolean qualifiers over the entire query. It would be possible to simulate the Boolean expression by making multiple queries and combining the results. However, the number of queries needed grows exponentially with the number object property annotations and the solution will not be scalable. The Boolean expression above will require 9 separate queries. If the requester adds another requirement, the number of queries required increases to 27.

It is impossible to provide a scalable semantic query capability using the existing UDDI search engine alone. An exemplary embodiment of the present invention uses an additional matchmaker component on the client side as illustrated in FIG. 8.

Figure 8:
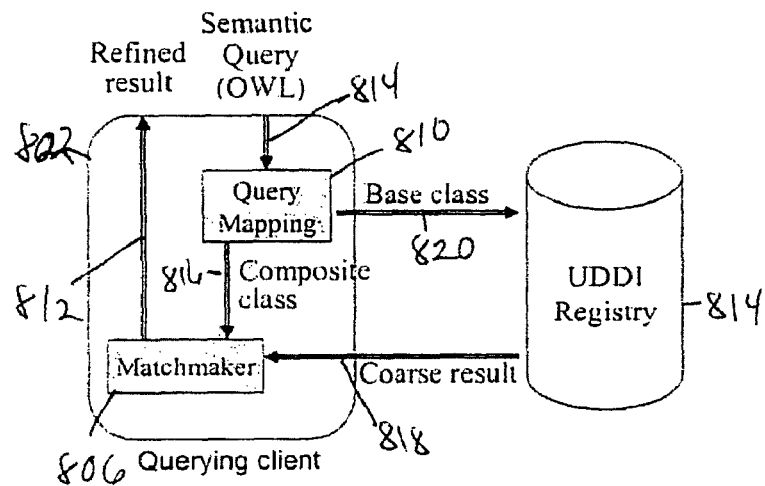
FIG. 8 illustrates an overview of the querying process in accordance with an exemplary embodiment of the present invention.
Figures 9, 10:
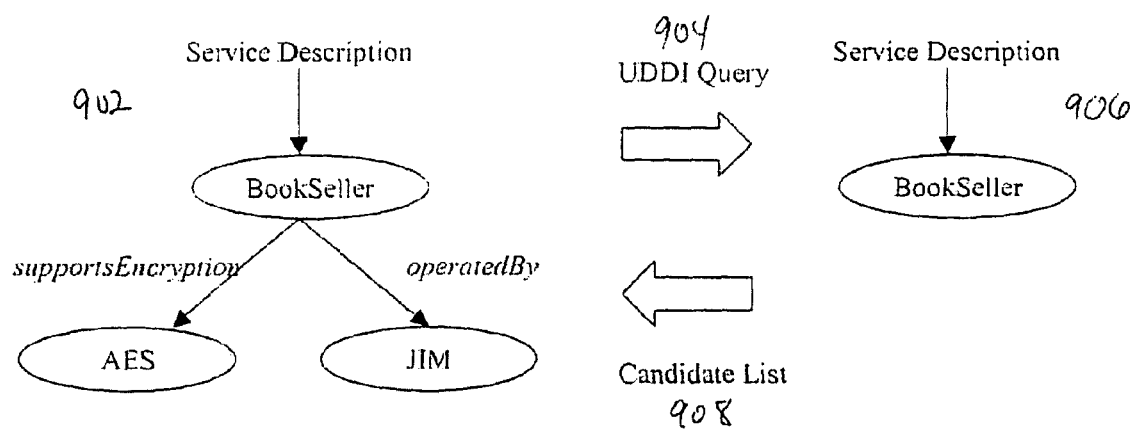
FIG. 9 illustrates a query processed by UDDI.
FIG. 10 illustrates identity concepts stored by ontology concept tModels in accordance with an exemplary embodiment of the present invention.

In FIG. 8, item 802 is a querying client that includes a query mapping portion 810 and a matchmaker portion 806. The query 820 processed by the UDDI search engine in the UDDI registry 804 will return a coarse list 818 of possible matching services based on the base ontology class of a service description. After the results 818 are returned by UDDI, matchmaker portion 806 in client 802 will refine the list by matching composite anonymous instances 816 provided by query mapping portion 810 in their entirety. For example, if the query is for a BookSeller that supports AES and is operated by Jim, the query passed on to UDDI will simply be for a BookSeller that is the base ontology class of the service description. UDDI registry 804 returns a list of potential service descriptions 818. Matchmaker 806 then refines the results 812 against the full composite concept of BookSeller that supports AES and is operated by Jim. FIG. 9 illustrates a query processed by UDDI in accordance with an exemplary embodiment of the present invention. In the figure, item 902 represents a client side query ontology, 904 is an UDDI Query, and 906 is a service description in an UDDI registry. Item 908 represents a course result, or candidate list, from the UDDI registry. Further refinement of candidate list 908 at the client side enables a syntactic search equivalent of a semantic search.

Querying client 802, is operable to communicate with UDDI registry 804 and may take many forms, non-limiting examples of which include: a processor; a plurality of processors, a computer readable medium having computer readable instructions thereon capable of instructing a computer; and a signal having computer readable instructions therein capable of instructing a computer.

The UDDI search engine may be made to return semantic results for its part of the query processing by resolving identity concepts at publishing time. Since queries to UDDI will only reference base classes, this list of identity concepts can be limited to classes and instances in the original ontology and will not include anonymous instances. This approach avoids the exponential growth problem mentioned earlier. Identity concepts for properties, classes, and instances are resolved at the publishing time of the ontology.

Whenever service descriptions or tModels reference an ontology concept, they will also reference its identity concepts. This can be done syntactically by copying over the identity concepts referenced by the ontology concept tModel. For example, service descriptions that reference the SellerService will need to also reference the identity concepts BookSellerService and Service. This way, the service description will be returned by the UDDI search engine for both SellerService as well as BookSellerService and Service queries. This applies to all ontology references including annotation references for service description, BusinessService objects, property definition, and base-class reference for composite concepts tModel objects, for example as shown in FIG. 10. FIG. 10 is a representation of a concept at the ontology publication, which includes a single domain of information, in accordance with an exemplary embodiment of the present invention. In the figure, the group of objects 1010 correspond to item 110 of FIG. 1A, whereas the group of objects 1012 correspond to item 120 of FIG. 1A. Object 1014 indicates that "operatedBy" is a property concept whereas object 1016 indicates that "contactPerson" is an identity concept of the "operatedBy" property concept. Object 1018 corresponds to item 128 of FIG. 2. Object 1020 indicates that "SellerService" is an identity concept of "BookSeller" property concept and "Service" property concept.

Annotation references are captured inside keyedReferenceGroups such as illustrated in FIG. 11. FIG. 11 is a representation of a concept at the service publication, which includes a many domains of information, in accordance with an exemplary embodiment of the present invention. The matching miles for keyedReferenceGroup require the child keyedReferences specified in the query to be a subset of the child keyedReferences in the service description. This set operation is effectively the AND Boolean operator. Property type and property value tModels can be stored in parallel keyedReferences inside keyedReferences without any special designation. The query can simply reference a property type tModel and a property value tModel inside the keyedReferenceGroup and they will correctly match annotations in service descriptions according to UDDI matching rules.

Client side matchmaker portion 806 also makes use of the identity concept information for semantic matching. Matchmaker portion 806 may simply compare the concept specified in the query with all the identity concepts of the service description concept at each level of annotation. The result is the same as a semantic match between the two concepts. However, matchmaker 806 may operate syntactically and it may not need to be ontology aware.

System Architecture

FIG. 12 shows an overall system architecture of an exemplary embodiment of the present invention. In the figure, the system 1200 includes an ontology publisher 1202, a service description publisher 1204, an UDDI registry 1206, and a querying portion 1208. Ontology Mapping module 1210, service description mapping module 1212, client-side matchmaker module 1214 and query mapping module are four add-on modules that reside on the client side. These modules may only be needed for clients wishing to use UDDI as a semantic registry. Other clients may use the UDDI registry normally.

In an exemplary embodiment of the present invention, ontology mapping module 1210 and service description mapping module 1212 are implemented in XSLT and Java. Of course other languages may be used. In this embodiment, XSLT translates OWL descriptions into the UDDI data model and Java code publishes them into the registry using the UDDI publication API.

Query mapping module 1216 may also be implemented in XSLT and Java. In an exemplary embodiment, the XSLT component translates the OWL queries into the UDDI data model and strips annotations from composite concepts. The Java component then queries the registry through the UDDI inquiry API. The BusinessServices returned by the registry is matched using only base ontology concepts.

In an exemplary embodiment, client-side matchmaker module 1214 is a Java module. It refines the query results by performing the matchmaking that takes into account all the annotations of composite concepts. Client-side matchmaker module 1214 retrieves a tree of tModels that are associated with each BusinessService and then matches with the composite concept from the query. This component is necessary because the UDDI specification lacks support for Boolean queries. Its task can be folded into the registry if future versions of UDDI support Boolean queries.

Of course each one of ontology publisher 1202, service description publisher 1204, a querying portion 1208, ontology Mapping module 1210, service description mapping module 1212, client-side matchmaker module 1214 and query mapping module 1216 may take many forms, non-limiting examples of which include: a processor; a plurality of processors, a computer readable medium having computer readable instructions thereon capable of instructing a computer; and a signal having computer readable instructions therein capable of instructing a computer.

OWL Language Support

The capabilities of the present invention are governed by the functional limitations of UDDI and the desire to keep the solution simple. The identity concept approach captures the overall class and property hierarchy expressed in the ontology. The UDDI data structure supports service descriptions and classes that are annotated with property values in multiple layers. This includes instance annotation defined by service descriptions as well as class annotations using restriction classes defined by ontologies. The present invention fully supports the following OWL language constructs: Class definition; ObjectProperty definition; DatatypeProperty definition; subClassOf and equivalenceClass relationship; subPropertyOf and equivalentProperty relationship; Restriction classes with onProperty and hasValue attributes; and Annotation of concepts using properties.

Query Support

The requirements for query support will govern the specifics of the mapping from OWL data structures to the UDDI data model. In an exemplary embodiment of the present invention, extra data and tags may be stored to provide support for specific categories of queries. In a specific exemplary embodiment, four categories of queries may be supported by the system. The first two types deal with finding tModels of ontology concepts while the last two deal with finding BusinessService objects representing service descriptions.

Ontology Query

This category of queries allows users retrieve all tModels associated with a specific ontology from the UDDI registry. In order to allow for this query, all ontology concepts reference a single tModel that is created to represent the overall ontology. Queries for tModels with references to that ontology tModel return all the concepts associated with the ontology. The user should be able to either retrieve only the base ontology tModels, or all the ontology tModels including anonymous instance defined by service descriptions. To make this possible, base ontology tModels reference a special tModel created specifically to indicate that a tModel represents a base ontology concept. Queries for tModels with that reference return only the base ontology concepts.

Ontology Concept Query

This category of queries allows users to find the tModel for a specific class or property type. The class can be either a base class defined by the ontology or an anonymous instance defined by service descriptions. The base ontology tModel carries the same name as the class or property type it represents in the ontology. Consequently, they can be queried for directly by name. Anonymous instance tModels, on the other hand are unnamed and should be queried for using their base classes. The UDDI search engine returns all the tModels with a particular base class and the client side matchmaker refines the results by resolving and matching the concepts in their entirety. To support semantic matching, all class and instance tModels should hold a list of base ontology identity classes. The relationship between the identity classes and the original concept should also be captured so the query can be customized. For example, if the query is for AES, the user should be able to require an exact match, in which case only AES would be returned, or only require a partial match, in which case Encryption would also be returned. It is possible for multiple tModels to match a single query. The matchmaking rules will be discussed later.

Complete Service Description Query

This category of queries allows users to query for service descriptions by specifying annotations in their entirety. Ontology references are attached to the service with all the property types and property values fully defined. The users are basically querying with the hypothetical description of their desired service. The query forwarded to the UDDI will only contain the base classes of anonymous instances. Hence the BusinessService object will need to also reference the base class of any anonymous instances it uses as property values. In order to have semantic matching, all the identity concepts of the base class should be included as well. Again, the relationship between the identity classes and the original concept will be captured so the query can be customized. All the references will be stored in a single KeyedReferenceGroup to represent the entire property definition. The matchmaker on the client side will refine the results by resolving and matching the anonymous instances in their entirety. An exemplary structure of complete service description queries is illustrated in FIG. 13.

Partial Service Description Query

This category of queries allows users to query using snippets of annotation instead of fully defined service descriptions. They are for users that want to find services that reference particular concepts but do not care how those concepts are connected to the service descriptions. An exemplary structure of partial service description queries is illustrated in FIG. 14.

Special data structures are created in UDDI to support this type of queries. A special tModels-used KeyedReferenceGroup in the BusinessService object hold references to all the concepts used as property values as well as property types. The query may involve either a combination of the property value concept and the property type, or simply a property value concept. Both pieces of information are stored and the user has the option to use them both, or ignore the property type by using a wildcard in the query. Since UDDI lacks Boolean support, this query can only be made with a single property. Querying with multiple property value concepts will require Boolean expressions that simply cannot be expressed in UDDI.

Mapping Specifications for Publication tModels in this section reference UDDI type tModels so they can be used as if they were categorization systems. The tModelKeys for ontology class tModels in the following examples are denoted in the form of ontology:class for the sake of clarity. Actual keys used by the UDDI registry may be different. Similarly, names in the OWL descriptions also take the form of ontology:class.

Bookkeeping tModels

Five tModels may be used for bookkeeping purposes as part of the mapping from OWL to the UDDI data model.

Base Ontology Designation tModels

This tModel is used to differentiate between concepts that are defined by the ontology and anonymous instance defined by service descriptions. This tModel is referenced by all the tModels created as part of the ontology. This tModel is named "isOntologyBase." FIG. 15 illustrates an exemplary "isOntologyBase" tModel in accordance with the present invention. Conversely, anonymous instances reference another tModel named "isAnonymousInstance". FIG. 16 illustrates an exemplary "isAnonymousInstance" tModel in accordance with the present invention.

PropertyDefinition tModel

KeyedReferenceGroups that define a property annotation reference this tModel as the tModelKey. This tModel is named "propertyDefinition." FIG. 17 illustrates an exemplary "propertyDefinition" tModel in accordance with the present invention.

TModelsUsed tModel

In order to support the forth categories of queries, BusinessService objects keep track of all the tModels it uses either directly or indirectly. For example, if the BusinessService references the anonymous instance BookSeller operated by Jim, it will need to make an additional reference to the tModel for Jim so that it will be returned by partial service description queries for Jim. The list of tModels used is kept by BusinessService objects in the tModels-used KeyedReferenceGroup. This tModel is referenced as the tModelKey of that KeyedReferenceGroup. This tModel is named "tModelsUsed." FIG. 18 illustrates an exemplary "tModelsUsed" tModel in accordance with the present invention.

Property Restriction

The domain and range restrictions for property types are be enforced by UDDI. Such enforcement is left to the users who create the OWL documents to correctly assign property attributes. However, this information is captured in the tModel for the sake of completeness. They are held in a special keyedReferenceGroup in the property tModel. This tModel is referenced as the tModelKey of that reference group. This tModel is named "propertyRestiction." FIG. 19 illustrates an exemplary "propertyRestiction" tModel in accordance with the present invention.

Translation of the Ontology

There are four types of tModels associated with the translation of OWL ontologies into the UDDI data model. Each of these tModels makes KeyedReferences to UDDI tModels for categorization systems so their references can hold a key-Value. In addition to user defined ontologies, the OWL ontologies may also be imported into the registry.

Ontology tModel

The ontology tModel serves as a placeholder and namespace for the ontology as a whole. It holds overview information including the ontology name, description, and URL links to external resources. This tModel may be referenced by all property type and class tModels associated with the ontology with the keyValue of "ontologyReference". FIG. 20 illustrates an exemplary translation of ontology tModels in accordance with the present invention, wherein group of objects 2002 is a group of OWL ontology tModels, and wherein group of objects 2004 are the UDDI translated tModels.

Property Type tModels

The property type tModel stores ObjectProperty information defined in the ontology. They hold KeyedReferences to the UDDI tModels for categorization groups so they can be used as the tModelKeys of KeyedReferenceGroups. The name of the tModel is set to the name of the class defined in the ontology. It holds a KeyedReference to the ontology tModel to indicate which ontology it belongs to. It also holds a KeyedReference to the ontology base designation tModel indicating that it is a base ontology tModel. In addition, it holds KeyedReferences to other ontology property type tModels representing its identity concepts. The identity concepts are derived from the property hierarchy defined in the ontology and generated by the ontology reasoner. Unlike classes and instances, properties cannot be annotated and there are no anonymous properties the way there are anonymous instances. The domain and range restrictions for property types are not enforced by UDDI. It is up to the users who created the OWL-S documents to correctly assign property attributes. However, this information is captured in the tModel for the sake of completeness. The domain and range information for the property is held in a special keyedReferenceGroup with the "propertyRestiction" tModel as the tModelKey. The domain and range classes are referenced using children keyedReferences with the keyValue of "domain" and "range" respectively. All properties have an identity concept to itself with the relationship type of "exactProperty." The other possible values are "equivalentProperty," "generalizationProperty" and "specializationProperty." FIG. 21 illustrates an exemplary translation of property type tModels in accordance with the present invention, wherein group of objects 2102 is a group of OWL property type tModels, and wherein group of objects 2104 are the UDDI translated tModels. The list of identity properties is derived from the ontology property hierarchy determined by the ontology reasoner. This is discussed in detail below.

Ontology Class tModels

The ontology class tModel stores class information defined by the ontology. The name of the tModel is set to the name of the class defined in the ontology. It holds KeyedReferences to the ontology tModel and the ontology base designation tModel the same way as property type tModels. In addition, it holds KeyedReferences to other ontology class tModels representing its identity classes. The type of relationship is stored in the keyValue field of the KeyedReferences. All classes and instances have an identity relationship to itself with the relationship type of "exactRelationship." The other possible values are "equivalentRelationship," "generalizationRelationship" and "specializationRelationship." The list of identity classes and instances is derived from the ontology class hierarchy determined by the ontology reasoner. FIG. 22 illustrates an exemplary translation of class and instance tModels in accordance with the present invention, wherein group of objects 2202 is a group of OWL ontology class tModels, and wherein group of objects 2204 are the UDDI translated tModels.

Restriction Classes

Figure 23:
FIG. 23 illustrates a translation of restriction class tModels in accordance with an exemplary embodiment of the present invention.

Restriction classes with the hasValue attribute are composite concepts defined as part of the ontology. The name of the tModel is set to the name of the class defined in the ontology. It holds KeyedReferences to the ontology tModel and the ontology base designation tModel the same way as property type and ontology class tModels. It also holds KeyedReferences to other ontology class tModels representing its identity concepts. The list of identity concepts for the restriction class is the same as for the base class of the restriction class and may be simply copied from the base class tModel. Property value definitions are captured as KeyedReferenceGroups. The tModelKey of the KeyedReferenceGroups reference the "propertyDefinition" tModel. The property type and property value are stored as KeyedReferences under the KeyedReferenceGroup. All the identity concepts for both the property type and the property value should be referenced in the keyedReferenceGroup as well to facilitate query processing. The identity concept information can be obtained by querying for the concept tModel. However, this would require multiple queries and since UDDI lacks Boolean support, there is no way to combine results from separate queries into a new theory. Therefore, the identity concept information should to be replicated at different levels so that it is directly available to the UDDI search engine and eliminate the need for multiple queries. FIG. 23 illustrates an exemplary translation of restriction class tModels in accordance with the present invention, wherein group of objects 2302 is a group of OWL restriction class tModels, and wherein group of objects 2304 are the UDDI translated tModels in accordance with the present invention.

Translation of Service Description

Translation of service description involves two steps. First, tModels for any anonymous instances defined in the service description should be published into the registry. Second, the service description should be translated into a corresponding UDDI BusinessService objects. It is important to note that publication of service descriptions do not need to use the ontology reasoner. The identity concepts are established as part of publishing the ontology. Once that is done, publication of the BusinessService and anonymous instances can simply make copies of base class identity concepts. This is a completely syntax based process and does not need to be ontology aware.

Anonymous Instances

Anonymous instances defined in service descriptions are stored the same way as restriction classes defined in the ontology. The only difference is that anonymous instances are not named and the name field of the tModel is left blank. The list of identity concepts stored in the tModel is simply the list of identity concepts of the base ontology class of the anonymous instance.

If the base class of an anonymous instance is a restriction class, then the tModel of the anonymous instance also needs to replicate the property definition of that restriction class. Anonymous classes are composite concepts that can contain multiple layers of annotations. If the annotations are anonymous instances themselves, new tModels need to be created for them as well. It is important to note that anonymous instance tModels can be reused between service descriptions. Before creating another tModel, the registry may be queries for the anonymous instance and the existing tModel may be simply referenced if it is found. Property value definitions are captured as KeyedReferenceGroups the same way as restriction classes defined by the ontology. If the property value concept is an anonymous instance, then it needs to be stored in a KeyedReference with the keyValue of "specificRelationship." FIG. 24 illustrates an exemplary translation of anonymous instance tModels in accordance with the present invention, wherein group of objects 2402 is a group of OWL anonymous instance tModels, and wherein group of objects 2404 are the UDDI translated tModels.

Service Description

Figure 25:
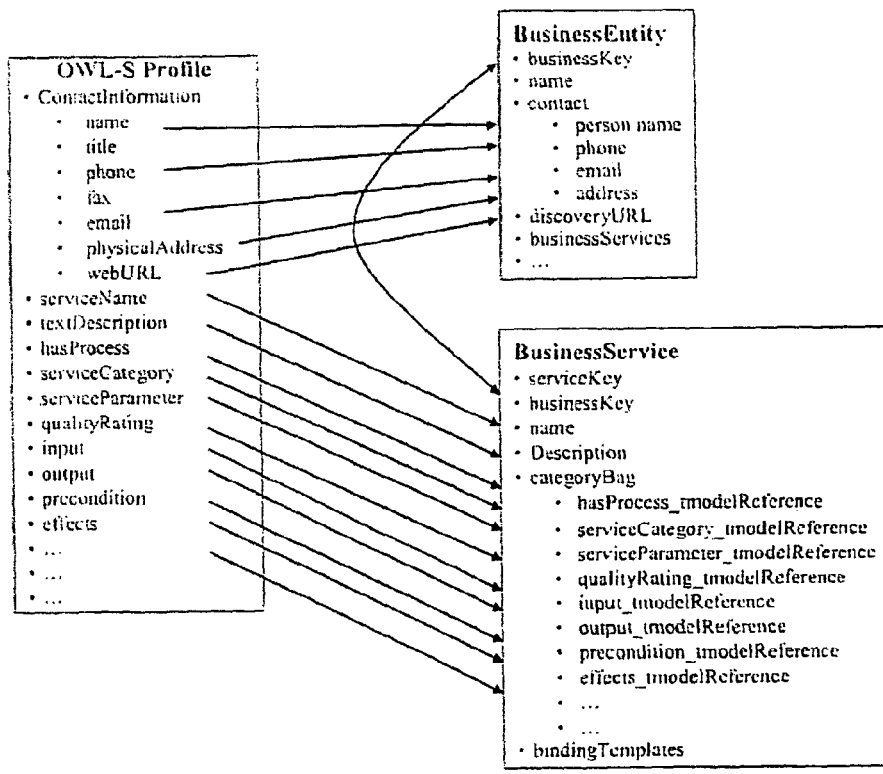
FIG. 25 is a diagram of a translation of OWL-S profile in accordance with an exemplary embodiment of the present invention.

Information in the OWL service description that maps to fields in the UDDI BusinessEntity and BusinessService data model objects can be translated directly. FIG. 25 illustrates an exemplary translation of service description BusinessService objects in accordance with the present invention.

Figure 26:
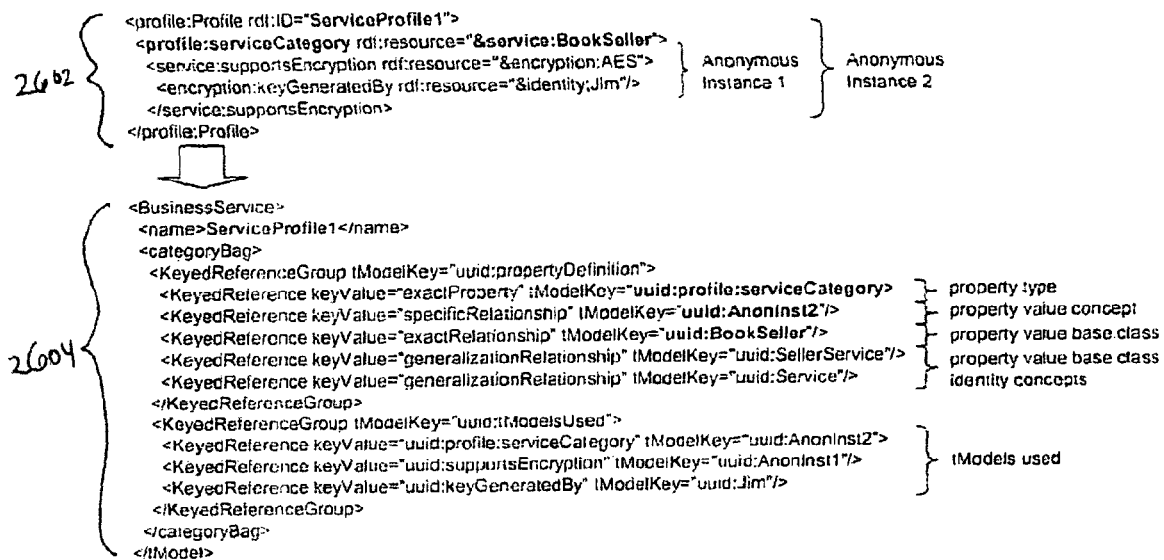
FIG. 26 illustrates a translation of service description BusinessService objects with respect to ontology concept references in accordance with an exemplary embodiment of the present invention.

Ontology references in the service description are stored as KeyedReferenceGroup the same way as in the tModels for restriction class and anonymous instances. In addition, a special KeyedReferenceGroup holds the list of tModels used by the service description to facilitate the forth category of queries, partial service description queries. The tModelKey of the KeyedReferenceGroup references the tModelsUsed tModel. The KeyedReferences under this KeyedReferenceGroup lists all the tModels directly or indirectly used by the restriction class as well as their property type. The tModelKeys of property types are stored in the keyValue fields and the tModelKeys of the property value concept are stored in the tModelKey fields. For the prototype, identity concepts are not referenced. Therefore, partial service description queries have limited semantic capabilities. FIG. 26 illustrates an exemplary translation of service description BusinessService objects with respect to ontology concept references in accordance with the present invention, group of objects 2602 is a group of OWL tModels, whereas group of objects 2604 are the UDDI translated tModels.

Matching Rules

Matchmaking in accordance with an exemplary embodiment of the present invention follows the model where service providers publish capabilities and service requesters query with requirements. In order for a service description to satisfy a query, every query requirement should be matched to a service description capability. There are five possible types of matches for each pair of capabilities and requirements—a perfect match, an equivalent match, a specialization match, a generalization match, and a mismatch.

The trivial case is a perfect match. That means the service description and the query specified use the exact same ontology class and property type. All the classes and property specified are identical.

An equivalent match occurs when there exists at least an equivalence relationship between classes and properties in the service description and those in the query.

A specialization match occurs when the service description is more specific than the query. A specialization match is a full match and will be treated as a match by the system. There are three ways this can occur. The first way is when the requirement specifies a more general class. For example, the service description parameter specifies AES while the query asks for Encryption. AES is a form of Encryption so it would definitely match. The second way is when the requirement specifies a less refined class. For example, the service description parameter specifies as BookSeller operated by Jim while the query asks for only a BookSeller. The third way is when the requirement specifies a more general property type. For example, the service specifies operatedBy while the query asks for contactPerson.

A generalization match occurs when the service description is more general than the query. This is the opposite of a specialization match. It is only a partial match. The class specification does not rule out a match, but the match cannot be guaranteed. This is not treated as a match by the system. There are also three ways this can occur. The first way is when the service description specifies a more general class. For example, the service description parameter specifies Encryption while the query asks for AES. Encryption specified in the service description could be AES, but it is not certain. Therefore, this is only a partial match. The second way is when the service description specifies a less refined class. For example, the service description parameter specifies BookSeller while the requirement asks for BookSeller operated by Jim. The service could be a BookSeller operated by Jim, but it is not certain. Therefore, it is only a partial match. The third way is when the service description specifies a more general property type. For example, the service specifies contactPerson while the query asks for operatedBy.

A mismatch occurs when specification of the classes rules out the possibility of a match. There are three ways this can occur. The first way is when the base class is mismatched. For example, the service description parameter specifies SellerService while the query asks for PurchasingService. The second way is when the attributes are mismatches. For example, the service description parameter specifies SellerService operated by Jim while the query asks for SellerService operated by Bruce. The third way is when the property type mismatch. For example, the service specifies operatedBy while the query asks for ownedBy.

The matchmaker should attempt to match every query requirement against every service capability. The degree of match for a single requirement is its highest level of match it has against all of the possible capabilities. The level of match between the requester and the service is the same as lowest degree of match for a query requirement. If at least one of the query requirements is not matched to a service description capability, then the query is not matched to the service description. The requestor will not be able to use the service. If all of the query requirements have at least a generalization match to the service description capabilities, then the there is a partial match between the query and the service description. The requester might be able to use the service, but it is not certain. It depends on the policy of the requester and the characteristics of the ontology. If all of the query requirements have a perfect, equivalent, or specialization match to the service description capabilities, then the requester can indeed use the service.

Under this set of matching rules, specialization matches are treated as full matches. This implies requirements specified with a general concept will match all of the children concepts under it. For example, if the query specifies Encryption as a requirement, then all of the subclasses of Encryption in the class hierarchy as well as all the anonymous instances with additional annotations will match the query. On the other hand, generalization matches are treated as only partial matches. When a service description specifies a general concept as a capability, it does not mean the service will support all the specific concepts under the general concept. For example, if a service description specifies Encryption as a capability, it does not mean it will support all of the more specific concepts such as AES, RSA, and RSA with keys generated Jim. Therefore, it is always in the interest of the service provider to describe their service with as much detail and specificity as possible. Publishing additional details will never prevent a match that would otherwise be made. Queries, on the other hand, should be as general as possible. Using more general concepts in a query will tend to yield more results.

Ontology Reasoner

The task of the ontology reasoner is to enumerate all the identity concepts of ontology classes, instances, and proper types during publication of the ontology. This information will be used by both the UDDI search engine and the client side matchmaker to perform semantic matching. The list of identity concepts depends on the matchmaking rules as well as the semantics of individual ontologies. There are four types of identity relationships based on class hierarchy that should be considered by the ontology reasoner. They correspond to the four types of match specified in the matching rules. The relationship type is defined from the perspective of identity concept. The definition of identity concept is related concepts queries for which should yield the original concept. If query for class A should return class B, then class A would be an identity class of class B. Class B would hold a reference to class A as an identity concept and the relationship type of that reference is the relationship type from A to B. The identity concept scheme is intended to allow for queries for concept A to return the related concept B. That means A is the concept the requester queried for and when concept B is returned, the requester would want to know the relationship of B with respect to A instead of the vice versa.

Figure 27:
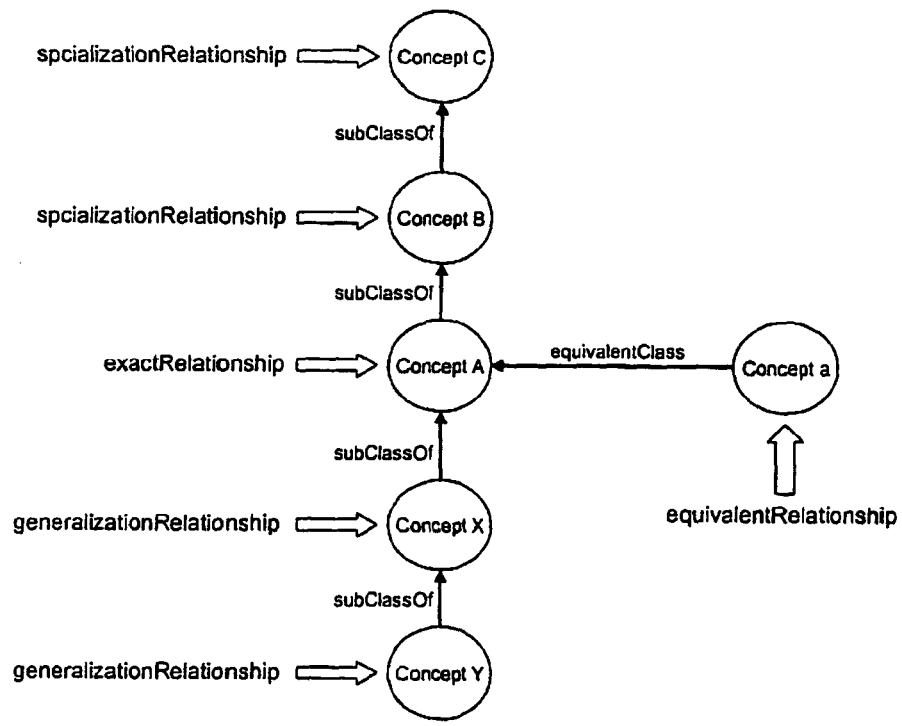
FIG. 27 illustrates an identity concept derivation for classes and instances in accordance with an exemplary embodiment of the present invention.

There are four possible types of identity concepts for classes and instances. The first is the exactRelationship, wherein all ontology concepts will make a reference to itself as an identity relationship. The second is the equivalenceRelationship, wherein for a given concept, all the other classes and instances to which the ontology established an equivalentClass or equivalentProperty relationship. The third is the specializationRelationship, wherein for a given concept, all the other classes and instances to which the ontology established a subClassOf relationship. Transitivity applies so that the parent class of a parent class is also a specializationRelationship identity concept. The fourth is the generalizationRelationship, wherein for a given concept, all the other classes and instances from which the ontology established an subClassOf relationship. Transitivity applies so that the children of a child class are also generalizationRelationship identity concepts. FIG. 27 illustrates an exemplary identity concept derivation for classes and instances in accordance with the present invention.

Figure 28:
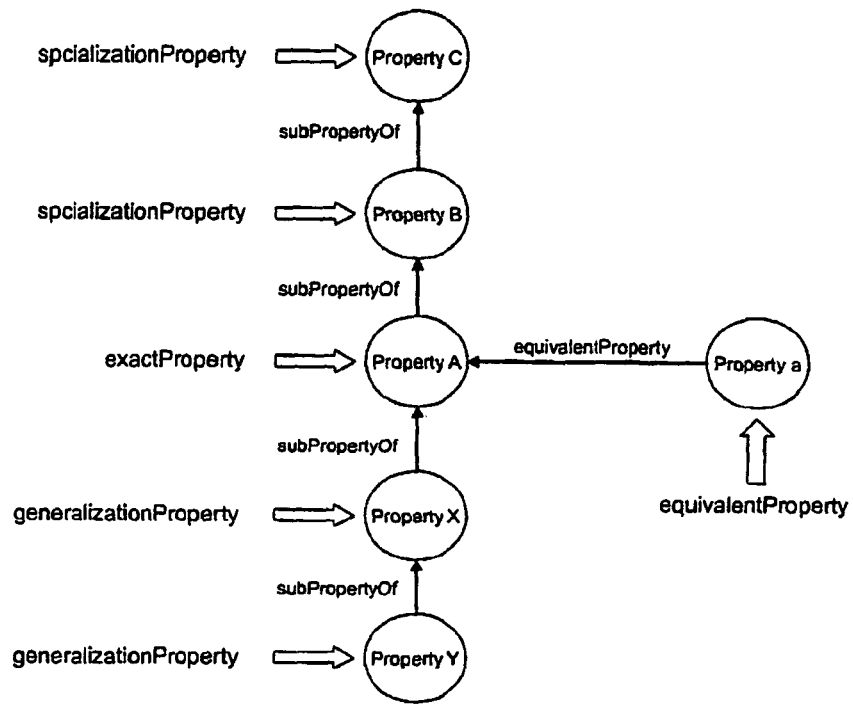
FIG. 28 illustrates an identity concept derivation for property types in accordance with an exemplary embodiment of the present invention.

There are four possible types of identity concepts for property types. The first is the exactProperty, wherein all ontology concepts make a reference to themselves as an identity relationship. The second is the equivalentProperty, wherein all the other properties to which the property the ontology established an equivalentProperty relationship. The third is the specializationProperty, wherein all the other properties to which the ontology established an subPropertyOf relationship from the property. Transitivity applies so that the parent property of a parent property is a specializationProperty identity concept. The fourth is the generalizationProperty, wherein all the other properties from which the ontology established an subPropertyOf relationship to the property. Transitivity applies so that the children of a child property are generalizationProperty identity concepts. FIG. 28 illustrates an exemplary identity concept derivation for property types in accordance with the present invention.

The ontology reasoner can be parameterized with respect to the number of layers to apply transitivity for specialization and generalization identity concepts. The publisher of the ontology can decide what makes sense for a particular ontology and modify the ontology reasoner module accordingly. In accordance with an exemplary embodiment of the present invention, the ontology reasoner module fully resolves both specialization and generalization transitivity relationships. Generalization matches are only partial matches and may not be useful in some context. Therefore, the publisher of the ontology should decide what makes sense for a particular ontology and modify the ontology reasoner module accordingly to appropriately resolve generalization and specialization identity concepts.

UDDI Query

Ontology Query

Queries for the ontology take place in two stages. The first stage involves querying for the tModel of the overall ontology concept using the ontology name and URL. The second stage then queries for all the tModels that make a reference to the ontology tModel using the keyValue of "ontologyReference." To locate only base ontology tModels, a query is made with the additional reference to the "isOntologyCore" tModel. This allows dynamic browsing of a specific ontology. To locate only anonymous instance tModels, a query is made with the additional reference to the "isAnonymousInstance" tModel.

TModel Query and Complete Service Description Query

Queries for service descriptions made to the UDDI registry take place in two stages.

The first stage involves retrieving all the tModel keys that are required by the second stage. A client-side query processor queries for tModels of all the concepts involved in the query. It resolves the tModel keys of all the classes, instances, and property types as well as the ontology and book keeping tModels. Base ontology concepts can be queried using the name of the concept along with a reference to the overall ontology concept. Queries for anonymous instance tModels should be processed by the client-side matchmaker. The queries processed by the UDDI registry only involve the base class of the anonymous instance.

The second stage uses the tModel keys from the result of the first stage to query for the BusinessService. This query also needs to be processed by the client-side matchmaker. The UDDI registry returns BusinessServices that reference the base class of the anonymous instance. The client-side matchmaker then refines the results by matching the entire concept.

In an exemplary embodiment, queries for service descriptions proceed as follows. First, there is a query for the tModel keys of the book keeping tModels such as "propertyDefinition." Next, there is a query for the tModel key of the ontology tModel. This is done either using the name of the ontology or the overviewURL. Then, there is a query for the tModel key of the various concepts involved in the query. They include the property type tModel, and the base ontology concepts tModels of property values. This is done using the name of the concepts and the ontology tModel. Since the portion of the query processing handled by the UDDI registry only involves base ontology concepts, it would not involve any anonymous instances and all tModel queries can be performed using the concept names. Finally, there is a query for BusinessService using the tModels keys resolved in previous steps.

The BusinessService objects make references to identity concepts for both the property type and the property value. Queries for any of the identity concepts return the BusinessService object. Therefore, the results of the query are effectively semantic. The requester can control the semantic matching by specifying the identity concept relationship type stored in the keyValue field of ontology concept keyedReferences. To find only a specific type of match, a query is made with the relationship type specified in the keyValue field. FIG. 29 illustrates an exemplary UDDI query for specific types of matches in accordance with the present invention.

To find all types of matches, users may use the approximate match find qualifier and query with a wildcard in the keyValue field. FIG. 30 illustrates an exemplary UDDI query for all types of matches in accordance with the present invention.

Partial Service Description Queries

Queries for partial service descriptions take place in two stages. The first stage involves queries for the tModel keys of the property type and property value tModels. The second stage queries for BusinessService objects that reference those concepts under the "tModelsUsed" keyedReferenceGroup. If multiple tModels are returned for the queries in stage one, multiple BusinessService queries may be made to the registry. FIG. 31 illustrates an exemplary UDDI query for partial service description queries in accordance with the present invention.

Client-side Matchmaker

The UDDI search engine is capable of fully fulfilling the first and forth categories of queries the ontology query and the partial service description query. The client side matchmaker is responsible for refining the results of the second and third categories of queries the ontology concept query and the complete service description query. For those queries, results from the UDDI search engine only take into account the base ontology classes of composite concepts. The client side matchmaker fully resolves the composite concepts in the service descriptions and determines the actual level of match.

Figure 32:
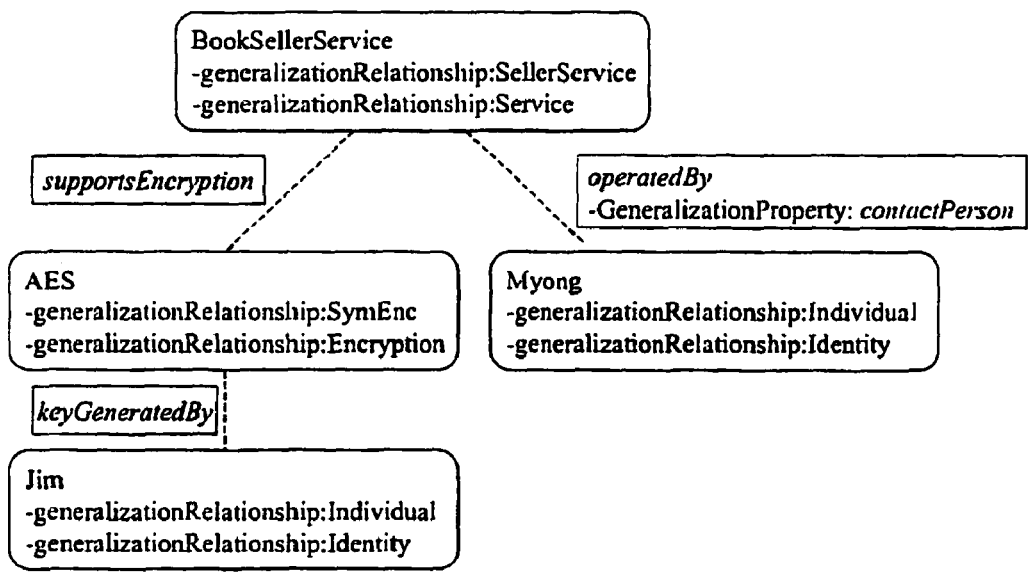
FIG. 32 illustrates a service description with all concept and identity concepts fully resolved in accordance with an exemplary embodiment of the present invention.

Resolution of composite concepts referenced by service descriptions is the first task of the client-side matchmaker. BusinessService objects hold annotations as KeyedReferenceGroups where children KeyedReferences store the keys of the concept tModels. The matchmaker in turn queries the UDDI registry for the concept tModels using the key and derives information regarding the base class and identity concepts. If the concept tModel has annotations of its own, they are resolved the same way. This process is repeated until the lowest layer concept tModels are reached, tModels that do not have any annotations of their own. This way, the service description can be reconstructed with all the annotations and identity concepts included. FIG. 32 illustrates an exemplary service description with all concept and identity concepts fully resolved in accordance with the present invention.

Figure 33:
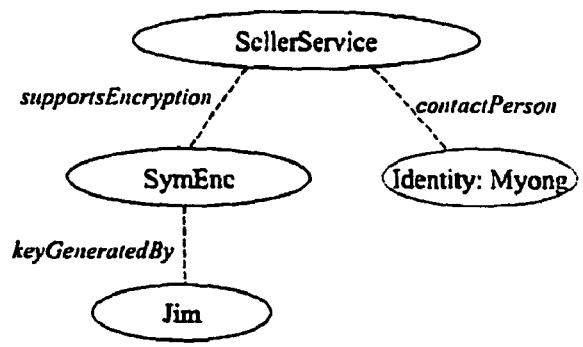
FIG. 33 illustrates a query concept in accordance with an exemplary embodiment of the present invention.

The second task of the client-side matchmaker is to determine the actual level of match between the query and service descriptions. This is done by matching the query concept and service description concept at corresponding annotation. The level of match for each individual concept can be derived from the identity relationship type of the matching concept in the reconstructed service description. FIG. 33 illustrates an exemplary query concept in accordance with the present invention.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method comprising:
receiving semantic data, wherein the semantic data is a plurality of groups of semantic concept data structures and at least one semantic relationship data structure relating at least one of the semantic concept data structures to another of the semantic concept data structures;
processing the semantic data with a semantic data processing module to create syntactic data, wherein the syntactic data is a plurality of groups of syntactic concept data structures corresponding to the plurality of groups of semantic concept data structures, and at least one syntactic relationship data structure relating at least one of the syntactic concept data structures to another of the syntactic concept data structures, the at least one syntactic relationship data structure corresponding to the at least one semantic relationship data structure, wherein the semantic data processing module is implemented in a computer system that comprises instructions stored in a machine-readable medium and a processor that executes the instructions;
storing the syntactic data in a syntactic database; and
performing a semantic query with a semantic query module against the syntactic data in the syntactic database wherein the semantic query module is implemented in a computer system that comprises instructions stored in a machine-readable medium and a processor that executes the instructions.

* * * * *